United States Patent [19]

Kozawa

[11] 4,260,222
[45] Apr. 7, 1981

[54] MULTI-LAYER NON-REFLECTING FILM

[75] Inventor: Tokujiro Kozawa, Hachiouji, Japan

[73] Assignee: Olympus Optical Co., Ltd., Tokyo, Japan

[21] Appl. No.: 53,419

[22] Filed: Jun. 29, 1979

[30] Foreign Application Priority Data

Jul. 11, 1978 [JP] Japan ................................. 53/84242

[51] Int. Cl.³ ............................ G02B 1/10; G02B 5/28
[52] U.S. Cl. .................................... 350/164; 427/166; 428/216; 428/333; 428/432; 428/696; 428/702
[58] Field of Search ............... 427/162, 166; 350/164; 428/539, 216, 333

[56] References Cited

U.S. PATENT DOCUMENTS

| | | | |
|---|---|---|---|
| 3,761,160 | 9/1973 | Apfel et al. | 350/164 |
| 3,783,010 | 1/1974 | Wille | 350/164 |

OTHER PUBLICATIONS

Stetter et al., "New Materials for Optical Thin Films", *Applied Optics* vol. 15, No. 10, Oct. 1976, pp. 2315–2317.

*Primary Examiner*—James R. Hoffman
*Attorney, Agent, or Firm*—Cushman, Darby & Cushman

[57] ABSTRACT

A multi-layer non-reflecting film uniform in refractive index and having favorable optical characteristics which comprises at least one layer made of a mixture of $Ta_2O_5$ and $ZrO_2$ containing 5 to 25% of $Ta_2O_5$.

8 Claims, 9 Drawing Figures

MULTI-LAYER NON-REFLECTING FILM

BACKGROUND OF THE INVENTION (a) Field of the invention

The present invention relates to a multi-layer non-reflecting film and, more specifically, to a multi-layer non-reflecting film having favorable optical characteristics and increased film strength.

(b) Description of the prior art

It is very difficult to manufacture a non-reflecting film by vacuum evaporation coating so as to obtain optical characteristics as designed since it is hard to form each layer by vacuum evaporation coating so as to have design thickness and refractive index. Especially in case where an vacuum evaporation-coated film contains zirconium oxide ($ZrO_2$), the above-mentioned difficulty is further aggravated since $ZrO_2$ makes refractive index of the film ununiform in the direction of the film thickness depending on temperature as film thickness increases. In other words, refractive index of film is made ununiform as base temperature rises. In order to form a vacuum evaporation-coated film having high strength by using, for example, magnesium fluoride ($MgF_2$), on the other hand, it is necessary to effect vacuum evaporation coating at a high base temperature since it is impossible to form a hard film at base temperature below 250° C. When a multi-layer non-reflecting film is formed by using $MgF_2$ and $ZrO_2$ in respective layers at a base temperature suited for vacuum evaporation coating of $MgF_2$, it is impossible to form a film of $ZrO_2$ having the desired refractive index uniform in the direction of the thickness, thereby widely deviating the optical characteristics of the resultant multi-layer film from the theoretical design values. Further, it is required to select a base temperature below 220° C. in order to obtain a $ZrO_2$ layer having a refractive index which is uniform in the direction of thickness and nearly equal to the design value. When $MgF_2$ is vacuum evaporation coated at such a low base temperature, however the, strength of the $MgF_2$ layer will be remarkably reduced.

SUMMARY OF THE INVENTION

A general object of the present invention is to provide a multi-layer non-reflecting film in which each layer is uniform in refractive index and has high strength and which has no temperature dependency by using a mixture of tantalum oxide $Ta_2O_5$ and zirconium oxide $ZrO_2$ instead of zirconium oxide $ZrO_2$ in some of the vacuum evaporation-coated layers.

DESCRIPTION OF THE PREFERRED EMBODIMENTS

The present invention relates to a multi-layer non-reflecting film in which a mixture material ($Ta_2O_5+ZrO_2$) of $Ta_2O_5$ (having a refractive index of 2.13) and $ZrO_2$ (having a refractive index of 1.96~1.98) is used instead of $ZrO_2$ in at least one of the multiple layers. The layer of $Ta_2O_5+ZrO_2$ should preferably contain $Ta_2O_5$ and $ZrO_2$ at a ratio of 1:19 to 1:3, i.e., 5 to 25% of $Ta_2O_5$ by weight. Speaking of this mixing ratio between $Ta_2O_5$ and $ZrO_2$, content of $Ta_2O_5$ at a ratio below 5% will provide substantially no effect to prevent the resultant film from being made ununiform in refractive index, etc. when base temperature is raised. In other words, a film composed of $Ta_2O_5+ZrO_2$ is substantially the same as one consisting only of $ZrO_2$ when content of $Ta_2O_5$ is lower than 5%. When content of $Ta_2O_5$ is mixed at a ratio exceeding 25%, in contrast, it will be rather hard to form a film by vacuum evaporation coating, and light is apt to be absorbed by the layer of $Ta_2O_5+ZrO_2$.

Figure 1:
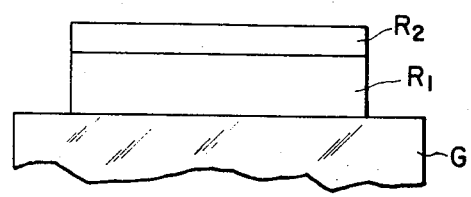
FIG. 1 shows a sectional view illustrating the composition of the two-layer non-reflecting film according to the present invention.
Figure 2:
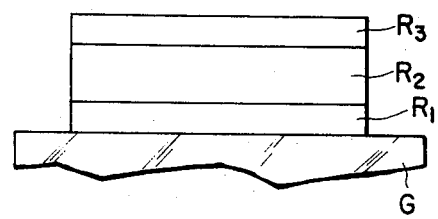
FIG. 2 shows a sectional view illustrating the composition of the three-layer non-reflecting film according to the present invention.

Among the multi-layer non-reflecting films using $Ta_2O_5+ZrO_2$ according to the present invention, the optical characteristics of the two-layer non-reflecting film shown in FIG. 1 will be compared with those of conventional two-layer non-reflecting film.

Figure 3:
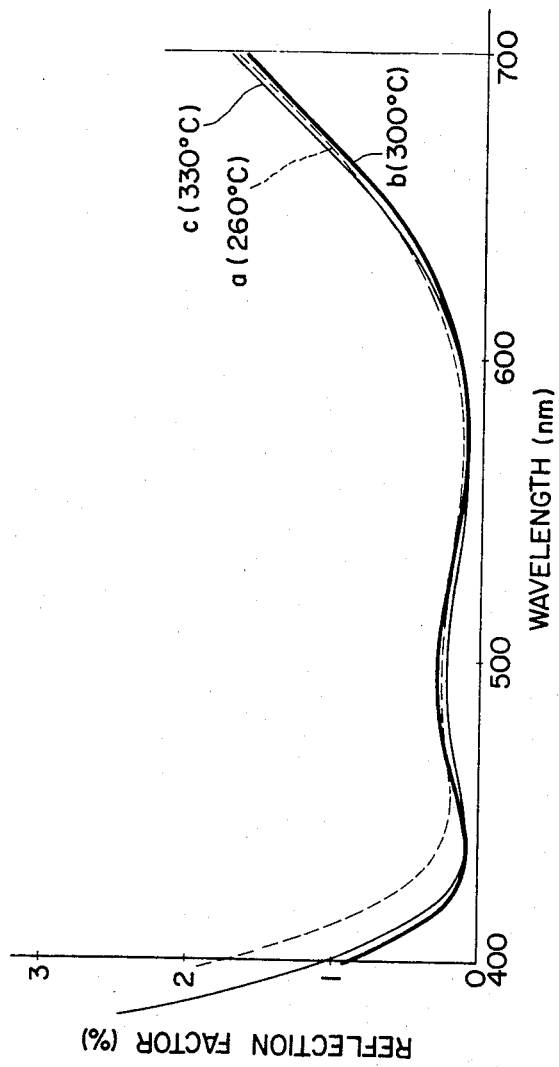
FIG. 3 shows the curves illustrating the optical characteristics of the two-layer non-reflecting film according to the present invention.
Figure 4:
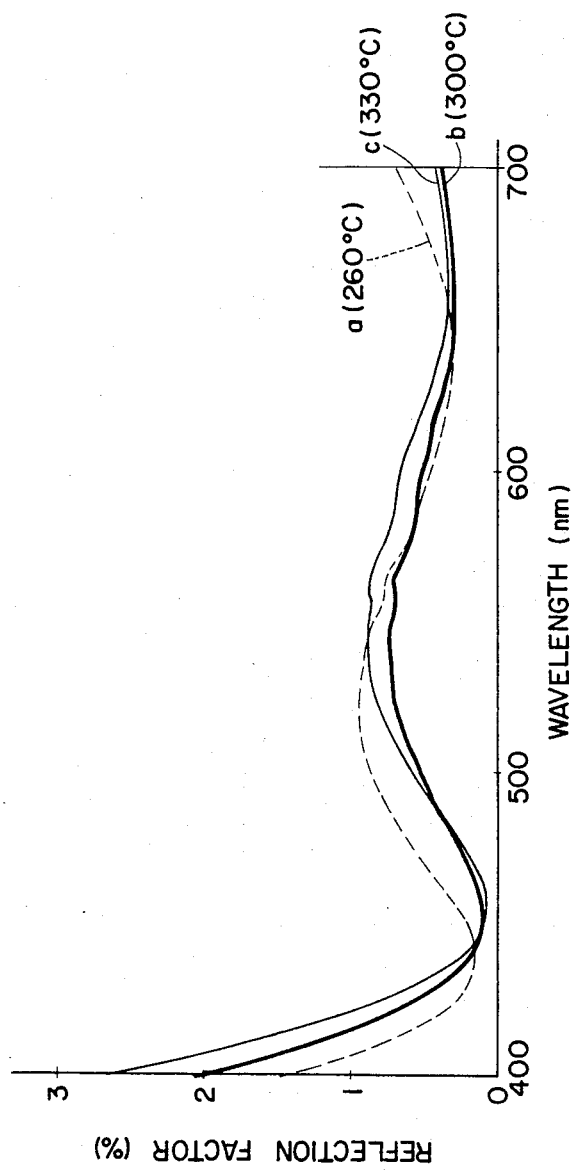
FIG. 4 illustrates the curves visualizing the optical characteristics of the conventional two-layer non-reflecting film.

In FIG. 1, the reference symbol G represents a base glass composed of SFS-5 over which a film of $Ta_2O_5+ZrO_2$ having thickness of $\lambda/2$ is vacuum evaporation-coated as a first layer $R_1$ and a film of $MgF_2$ having thickness of $\lambda/4$ is vacuum evaporation-coated as a second layer $R_2$. The optical characteristics of the non-reflecting film having such a composition as described above according to the present invention are illustrated in FIG. 3. In this figure, curves a, b and c visualize optical characteristics of non-reflecting films manufactured at base temperatures of 260° C., 300° C. and 330° C. respectively. FIG. 4 shows the optical characteristics of the conventional two-layer non-reflecting film which has the same composition as that shown in FIG. 1 and comprises a base glass G made of SFS-5, a film of $ZrO_2$ having thickness of $\lambda/2$ as the first layer $R_1$ and, a film of $MgF_2$ having thickness of $\lambda/4$ as the second layer $R_2$. In FIG. 4, the curves a, b and c correspond to optical characteristics of multi-layer non-reflecting films manufactured at base temperatures of 260° C., 300° C. and 330° C. respectively.

Figures 5, 6:
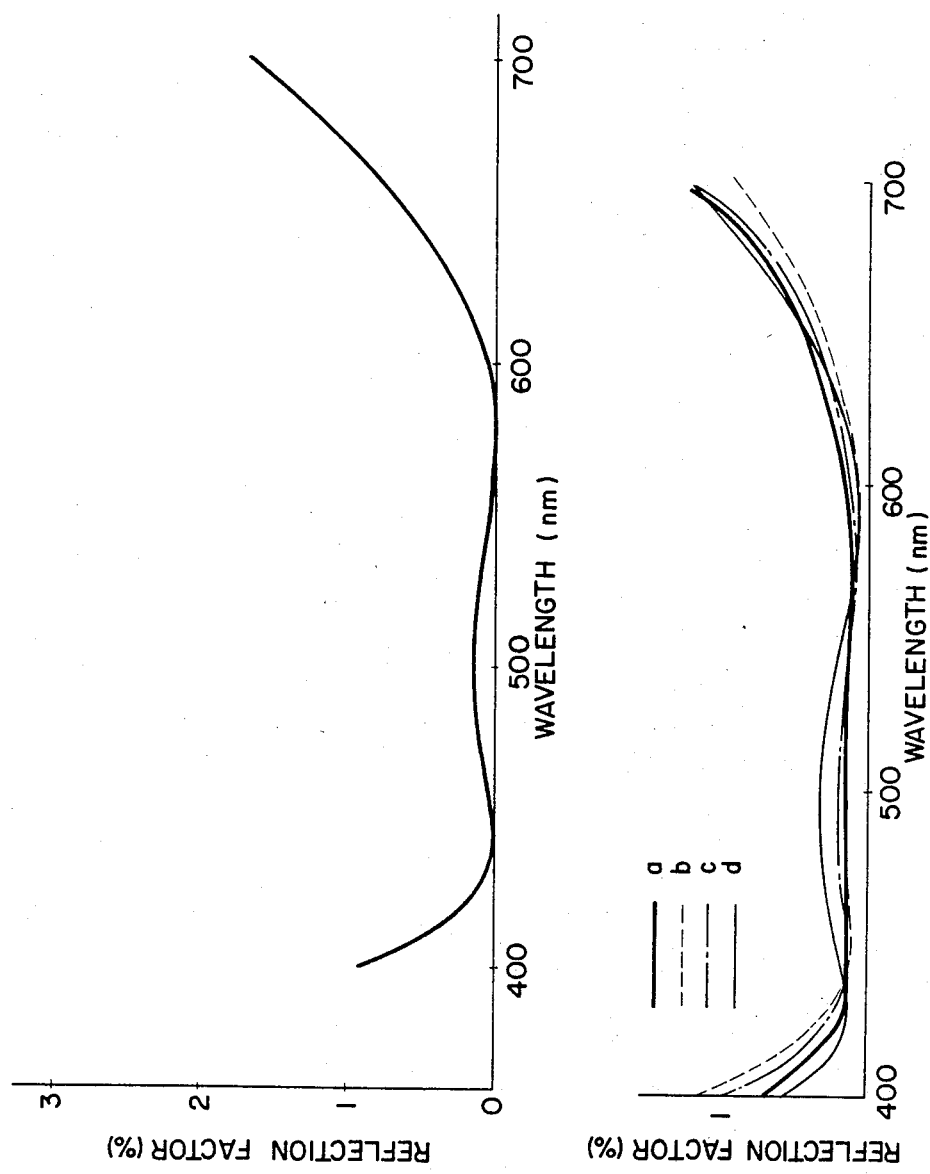
FIG. 5 illustrates a curve visualizing the optical characteristics on the basis of the theoretically calculated values of the two-layer non-reflecting film.
FIG. 6 illustrates the curves showing the optical characteristics of the three-layer non-reflecting film according to the present invention.

As is clearly understood by comparing the curves shown in FIG. 3 with those illustrated in FIG. 4, the non-reflecting films using layers of $Ta_2O_5 + ZrO_2$ according to the present invention have the optical characteristics which are more excellent than those of the conventional non-reflecting films using layers of $ZrO_2$. FIG. 5 summarises calculation values for a non-reflecting film which has the same composition as that of the above-mentioned non-reflecting film according to the present invention and the conventional film. From this figure, it will be clear that the optical characteristics of the two-layer non-reflecting films according to the present invention are very close to those traced on the basis of the calculation values. Needless to say, the layer of $MgF_2$ has high strength in the two-layer non-reflecting film according to the present invention since it is manufactured at a base temperature higher than 250° C.

Figure 9:
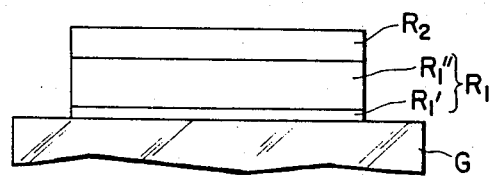
FIG. 9 shows a sectional view illustrating the composition of the two-layer non-reflecting film which comprises an equivalent layer (a multi-layer with homogeneous layers having a refractive index equivalent to a refractive index of a homogeneous film or inhomogeneous film) used as the first layer according to the present invention.
Figure 7:
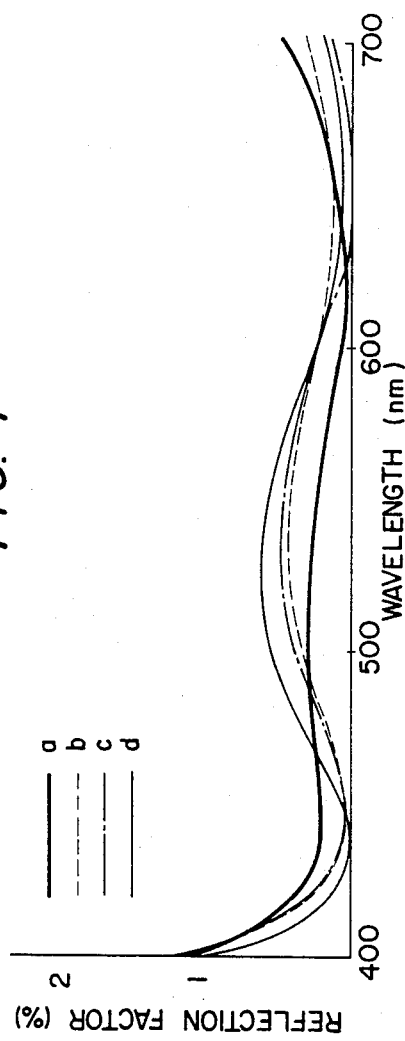
FIG. 7 illustrates the curves showing the optical characteristics of the conventional three-layer non-reflecting film.
Figure 8:
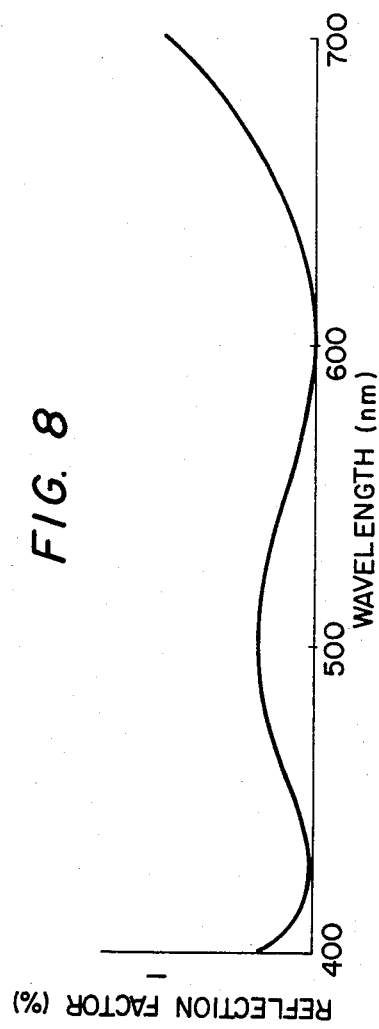
FIG. 8 shows the curves illustrating the optical characteristics on the basis of the theoretically calculated values of the three-layer non-reflecting film.

Next, optical characteristics of the three-layer non-reflecting films according to the present invention will be compared with those of the conventional ones. The three-layer non-reflecting film according to the present invention and as illustrated in FIG. 3 consists of a white glass ($n_d = 1.5230$) used as the base glass G, a film of $CeF_3$ having thickness of $\lambda/4$ as the first layer $R_1$, a film of $Ta_2O_5 + ZrO_2$ having thickness of $\lambda/2$ as the second layer $R_2$ and a film of $MgF_2$ having thickness of $\lambda/4$ as the third layer. FIG. 6 illustrates the optical characteristics of this non-reflecting film according to the present invention. The curves a, b, c and d shown in FIG. 6 represent the optical characteristics of the multi-layer non-reflecting films which are manufactured at base temperatures of 140° C., 200° C., 260° C. and 320° C. respectively. FIG. 7 illustrates the optical characteristics of the conventional three-layer non-reflecting films which comprise a white glass used as the base glass G, a film of $CeF_3$ having thickness of $\lambda/4$ as the first layer $R_1$, a film of $ZrO_2$ having thickness of $\lambda/2$ as the second layer $R_2$ and a film of $MgF_2$ having thickness of $\lambda/4$ as the third layer $R_3$. The curves a, b, c and d shown in FIG. 7 represent optical characteristics of the multi-layer non-reflecting films which are manufactured at base temperatures of 140° C., 200° C., 260° C. and 320° C. respectively. By comparing the data shown in FIG. 6 with those illustrated in FIG. 7, it will be clear that the three-layer non-reflecting films according to the present invention have optical characteristics which are more excellent than those of the conventional three-layer non-reflecting films. FIG. 8 visualizes the optical characteristics determined on the basis of calculation values for a three-layer non-reflecting film having the same composition as that of the above-described three-layer non-reflecting films. It will be noted that the optical characteristics of the three-layer non-reflecting film according to the present invention shown in FIG. 6 are quite similar to those illustrated in FIG. 8. In the foregoing, descriptions have been made on the Embodiment 1 which uses a film of $Ta_2O_5 + ZrO_2$ as the first layer kept in contact with the base glass and the Embodiment 2 which comprises the first layer having thickness of $\lambda/4$, the second layer having thickness of $\lambda/2$ and the third layer having thickness of $\lambda/4$ and uses $Ta_2O_5 + ZrO_2$ as said second layer. However, the present invention is not limited to these embodiments but applicable to form multi-layer non-reflecting films having favorable optical characteristics by using films of $Ta_2O_5 + ZrO_2$ in various layers. For example, multi-layer non reflecting films having favorable optical characteristics will be obtainable by using a film of $Ta_2O_5 + ZrO_2$ as the first layer in a two layer film which consists of the first layer having thickness of $\lambda/4$ and the second layer having thickness of $\lambda/4$ or using a film of $Ta_2O_5 + ZrO_2$ as the second layer in a three-layer film which consists of the first layer having thickness of $3\lambda/4$, the second layer having thickness of $\lambda/2$ and the third layer having thickness of $\lambda/4$. Further, in the cases of the above-mentioned three-layer film which comprises the first layer having thickness of $\lambda/4$, the second layer having thickness of $\lambda/2$ and the third layer having thickness of $\lambda/4$ or the three-layer film which comprises the first layer having thickness of $3/4\lambda$, the second layer having thickness of $\lambda/2$ and the third layer having thickness of $\lambda/4$, it will be possible to form the first layer by arranging thin films having high refractive index alternately with film having low refractive index so as to be equivalent to the first layer having desired intermediate refractive index (layer having thickness of $\lambda/4$), and uses a film of $Ta_2O_5 + ZrO_2$ having thickness of $\lambda/2$ as the second layer. Furthermore, it will be effective to manufacture a two-layer film by using a layer equivalent to the first layer $R_1$ having thickness of $\lambda/2$ shown in FIG. 9 by evaporation coating a very thin film $R_1'$ of $MgF_2$ or $Al_2O_3$ and relatively thick film $R_1''$ of $Ta_2O_5 + ZrO_2$ in combination with a film of $MgF_2$ or the similar material having thickness of $\lambda/4$. In this case, it is possible to obtain a multi-layer non-reflecting film having optical characteristics very close to those determined on the basis of the theoretical values since spectral reflectance characteristic of the multi-layer non-reflecting film can be corrected more favorably by using a thin film $R_1'$ made of $MgF_2$ or the similar material in the equivalent layer and forming the other relatively thick layer $R_1''$ so as to have uniform refractive index by using $Ta_2O_5 + ZrO_2$.

Moreover, it will be possible to manufacture multi-layer non-reflecting films having high strength and favorable optical characteristics by using films of $Ta_2O_5 + ZrO_2$ in layers of various multi-layer films. As is understood from the foregoing descriptions, the present invention is makes it possible to manufacture multilayer non-reflecting films which are free from temperature dependency by forming thin layers through vacuum evaporation coating of a mixture of $Ta_2O_5$ and $ZrO_2$. Though it is necessary to select a high base temperature to form a strong film by vacuum evaporation coating $MgF_2$, for example, films of $Ta_2O_5 + ZrO_2$ can be favorably formed even at such a high base temperature. Since films of $Ta_2O_5 + ZrO_2$ have high strength when being vacuum evaporation-coated at such a high temperature, it is possible to impart high strength for each layer in the multi-layer non-reflecting films. The multi-layer non-reflecting films according to the present invention have high strength and optical characteristics which are quite close to the theoretically calculated values.

I claim:

1. A multi-layer non-reflecting film comprising at least two layers of least one of which is made of a mixture of tantalum oxide ($Ta_2O_5$) and zirconium oxide ($ZrO_2$) containing 5 to 25% by weight of tantalum oxide ($Ta_2O_5$).

2. A multi-layer non-reflecting film according to claim 1 consisting of a first layer having thickness of $\lambda/2$ and a second layer having thickness of $\lambda/4$ wherein said first layer is made of said mixture of tantalum oxide ($Ta_2O_5$) and zirconium oxide ($ZrO_2$).

3. A multi-layer non-reflecting film according to claim 2 wherein said first layer consists of a film which is located on the side in contact with the glass base plate thereof, is composed of a substance with a low refractive index and has thickness less than the quarter wave as determined by refractive index of said glass base plate and is a mixture of $ZrO_2$ and $Ta_2O_5$ having a total thickness less than the half wave and is equivalent to the half wave film in reflectance and in delay or advance of phase after final interference of the reflection light from the respective interface.

4. A multi-layer non-reflecting film according to claim 1 consisting of said first layer having thickness of $\lambda/4$ and said second layer having thickness of $\lambda/4$ wherein said first layer is made of said mixture of tantalum oxide ($Ta_2O_5$) and zirconium oxide ($ZrO_2$).

5. A multi-layer non-reflecting film according to claim 1 consisting of a first layer having thickness of $\lambda/4$, a second layer having thickness of $\lambda/2$ and a third layer having thickness of $\lambda/4$ wherein said second layer is made of said mixture of tantalum oxide ($Ta_2O_5$) and zirconium oxide ($ZrO_2$).

6. A multi-layer non-reflecting film according to claim 1 wherein said first layer consists of at least two films of a substance having high refractive index and a substance having a low refractive index which are evaporated alternately with each other, having a total optical thickness less than a quarter wave, and equivalent in reflectance and delay or advance in phase after mutual interference of reflection light from the respective interfaces to the quarter wave film.

7. A multi-layer non-reflecting film according to claim 1 consisting of a first layer having thickness of $3\lambda/4$, a second layer having thickness of $\lambda/2$ and a third layer having thickness of $\lambda/4$ wherein said second layer is made of said mixture of tantalum oxide ($Ta_2O_5$) and zirconium oxide ($ZrO_2$).

8. A multi-layer non-reflecting film according to claim 7 wherein said first layer consists of at least six films made of a substance having a high refractive index and a substance having a low refractive index which are evaporated alternately with one another, having a total optical thickness less than a three quarter wave and equivalent in reflectance and delay or advance in phase after mutual interference of reflection light from the respective interfaces to the three quarter wave film.

* * * * *